(12) United States Patent
Ramsinghani et al.

(10) Patent No.: US 8,370,950 B2
(45) Date of Patent: Feb. 5, 2013

(54) SECURING MIXED-MODE APPLICATIONS

(75) Inventors: Tarun Ramsinghani, Hyderabad (IN); Parthasarathy Krishnaswamy, Hyderabad (IN); Jonathan C. Hawkins, Seattle, WA (US); Jeffrey M. Cooperstein, Redmond, WA (US); Manu Vasandani, Jersey City, NJ (US); Parasuraman Narasimhan, Coimbatore (IN); Amit Kumar Gupta, Uttar Pradesh (IN)

(73) Assignee: Microsoft Corporation, Redmond, WA (US)

( * ) Notice: Subject to any disclaimer, the term of this patent is extended or adjusted under 35 U.S.C. 154(b) by 155 days.

(21) Appl. No.: 12/958,164

(22) Filed: Dec. 1, 2010

(65) Prior Publication Data

US 2012/0144495 A1 Jun. 7, 2012

(51) Int. Cl.
*H04L 9/00* (2006.01)
(52) U.S. Cl. ............... 726/26; 713/176; 713/181
(58) Field of Classification Search ............... 726/26–27, 726/30; 713/168, 170, 173, 176, 181; 717/100, 717/120, 127
See application file for complete search history.

(56) References Cited

U.S. PATENT DOCUMENTS

| 5,802,373 | A | * | 9/1998 | Yates et al. ............... 717/139 |
| 5,901,315 | A | * | 5/1999 | Edwards et al. ............... 717/124 |
| 7,743,423 | B2 | | 6/2010 | Lange et al. |
| 2009/0282474 | A1 | | 11/2009 | Chen et al. |

OTHER PUBLICATIONS

Keith Brown, Security Briefs: Beware of Fully Trusted Code, Pub. Date 2004, (6 pages).
Scott Gu, asp.net news with teeth, DotNetKicks.com Links. Mar. 10, 2008, (14 pages).
Secure Multi-tier Deployment, May 16, 2003, http://technet.microsoft.com/en-us/library/cc966455(printer).aspx, (17 pages).
Getting PhP and Ruby working on Windows Azure and SQL Azure, Mar. 2, 2010, (2 pages).
Dave Thompson, Security Best Practices in Azure, Jun. 21, 2010, http://msdnrss.thecoderblogs.com/2010/06/21/security-best-practices-in-azure-2/, (5 pages).

* cited by examiner

*Primary Examiner* — Hosuk Song
(74) *Attorney, Agent, or Firm* — Workman Nydegger

(57) ABSTRACT

Embodiments are directed to securing mixed-mode applications in a semi-trusted environment. In an embodiment, a computer system securely loads native data files associated with a mixed-mode application. The secure loading ensures that the native components upon which the managed component depends are authentic. The computer system implements a securely stored handle associated with the loaded native data files to provide secure communications between the managed component and the loaded native data files. The handle provides a trusted function pointer to an associated mixed-mode application function. The computer system also initiates a security permission request for each resource that is passed to the native components during execution of the mixed-mode application, so that each resource is verified before execution.

20 Claims, 4 Drawing Sheets

SECURING MIXED-MODE APPLICATIONS

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

In some cases, software applications have both managed components and native components. For example, the native components may include functions or files written in traditional, unmanaged software languages, while managed components may include functions or files written in managed software languages that run on a common language runtime. Software applications that include both native and managed components are typically referred to as "mixed-mode" applications. In some cases, mixed-mode applications may pose security issues as the code access systems in the common language runtime typically only control resources accessed from the managed code, and not from the native code.

BRIEF SUMMARY

Embodiments described herein are directed to securing mixed-mode applications in a semi-trusted environment. In one embodiment, a computer system securely loads native data files associated with a mixed-mode application. The secure loading ensures that the native components upon which the managed component depends are authentic. The computer system implements a securely stored handle associated with the loaded native data files to provide secure communications between the managed component and the loaded native data files. The handle provides a trusted function pointer to an associated mixed-mode application function. The computer system also initiates a security permission request for each resource that is passed to the native components during execution of the mixed-mode application, so that each resource is verified before execution.

In other embodiments, a computer system securely loads native data files associated with a mixed-mode application. The secure loading ensures that the native components upon which the managed component depends are authentic. The computer system implements a securely stored handle associated with the loaded native data files to provide secure communications between the managed component and the loaded native data files. The handle provides a trusted function pointer to an associated mixed-mode application function. The computer system initiates a security permission request for each resource that is passed to the native components during execution of the mixed-mode application, so that each resource is verified before execution. The computer system also transfers managed component resources to the loaded native component for implementation in the mixed-mode application.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
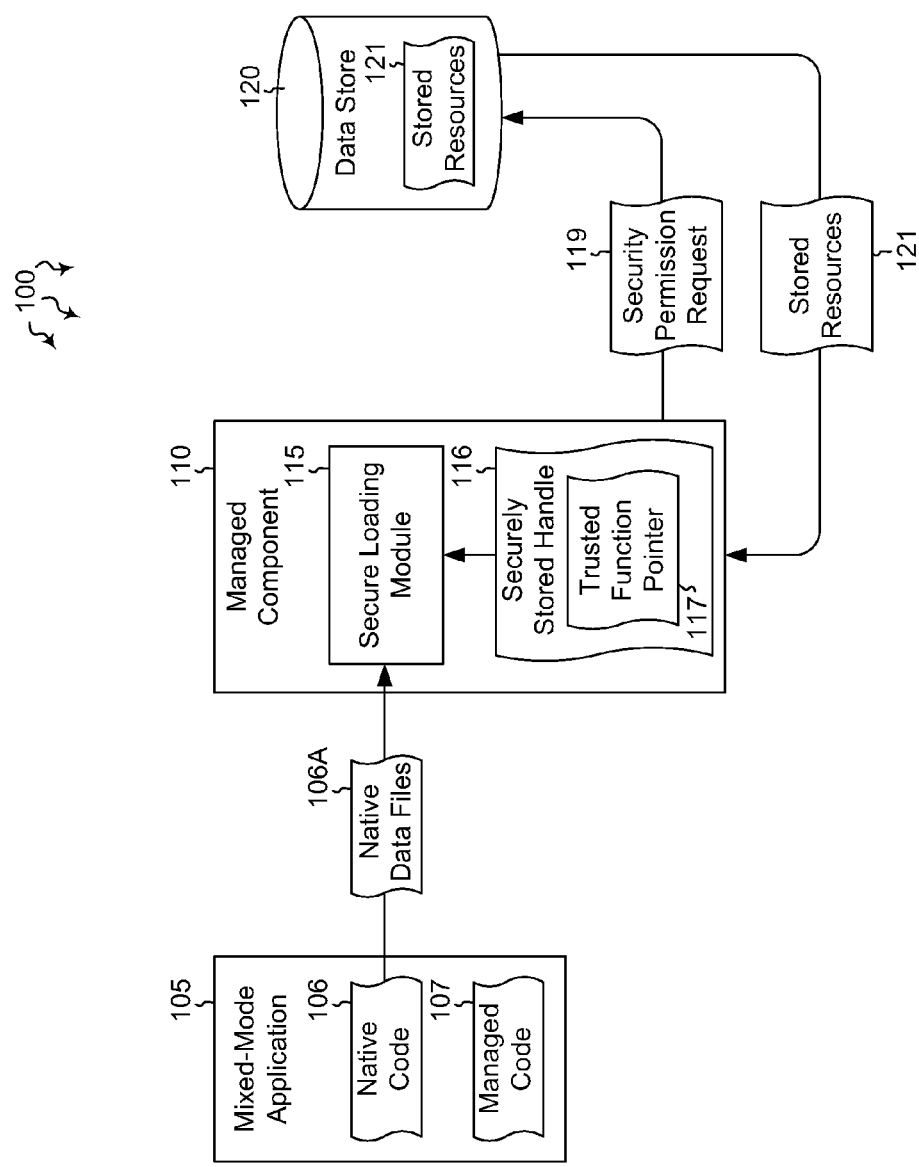
FIG. 1 illustrates a computer architecture in which embodiments of the present invention may operate including securing mixed-mode applications in a semi-trusted environment.

Embodiments described herein are directed to securing mixed-mode applications in a semi-trusted environment. In one embodiment, a computer system securely loads native data files associated with a mixed-mode application. The secure loading ensures that the native components upon which the managed component depends are authentic. The computer system implements a securely stored handle associated with the loaded native data files to provide secure communications between the managed component and the loaded native data files. The handle provides a trusted function pointer to an associated mixed-mode application function. The computer system also initiates a security permission request for each resource that is passed to the native components during execution of the mixed-mode application, so that each resource is verified before execution.

In other embodiments, a computer system securely loads native data files associated with a mixed-mode application. The secure loading ensures that the native components upon which the managed component depends are authentic. The computer system implements a securely stored handle associated with the loaded native data files to provide secure communications between the managed component and the loaded native data files. The handle provides a trusted function pointer to an associated mixed-mode application function. The computer system initiates a security permission request for each resource that is passed to the native components during execution of the mixed-mode application, so that each resource is verified before execution. The computer system also transfers managed component resources to the loaded native component for implementation in the mixed-mode application.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates a computer architecture 100 in which the principles of the present invention may be employed. Computer architecture 100 includes mixed-mode application 105. Mixed-mode application 105 (or application 105 herein) may include any type of software method, function, service or application that includes at least a portion of native code and a portion of managed code. Native code 106 may include any type of data files or non-managed code including software written in languages such as C and C++. The term data file, as used herein, may refer to native libraries (e.g. dynamic link libraries), native binaries or any other type of file that stores information. Managed code 107 may include any type of managed code or files written in languages that run on a common language runtime (CLR) such as Visual Basic or Visual C#. The mixed-mode application may include various different types of functionality. In many cases, the functionality provided is to be executed in a secure manner. This is true even in cases where the computing environment is not entirely trustworthy.

For example, in low- or medium-trust (i.e. semi-trusted) environments, many users may have access to files or other resources that are used by an application (e.g. mixed-mode application 105). Accordingly, a malicious user (or even an unknowing user) may alter or entirely replace files with different data that appears to be legitimate, but is in fact alternate data that may cause harm or other malfunctions to the computer systems that access it. Accordingly, managed component 110 is implemented to securely access data, even in a semi-trusted environment.

Managed component 110 includes secure loading module 115. Secure loading module 115 may be configured to securely load data that is to be used by the mixed-mode application. The secure loading module may access a securely stored handle 116 with a trusted function pointer 117 that points to a desired resource in the data file. The managed component 110 may send a security permission request 119 to data store 120 for stored resources 121. The data store may then send the requested stored resources 121 to the managed component. In this manner, the requested resources are securely loaded by the managed component, where they can be accessed and implemented by the mixed-mode application. Various techniques for securing and verifying the data, as well as the data transmissions will be explained in greater detail below.

In some cases, hash verification, signature verification, handle-based function invocation (as opposed to name-based function invocation), file integrity/security demands and other methods are implemented to reduce the security risks associated with running native code in a semi-trusted environment. Managed component 110 ensures that the native code 106 that is being executed is proper (i.e. it is has not been altered or changed in any way). Moreover, the managed component ensures that the resources the native code accesses have proper permissions in the stack above, thus allowing the mixed-mode application to safely run in a semi-trusted environment.

As mentioned above, the managed component 110 may implement a variety of different security techniques to make the different aspects of managed-to-native communication more secure. For instance, the native components 106 may be securely loaded by module 110. In a private deployment where multiple users have access to the application's data files, the native components can be easily tampered with as they are residing in unprotected folders. Native binaries also lack strong name, without which it may be difficult to determine the authenticity of the native code. Various different techniques may be used (alone or in combination with other techniques) to ensure that the correct native component is getting loaded.

Figure 4:
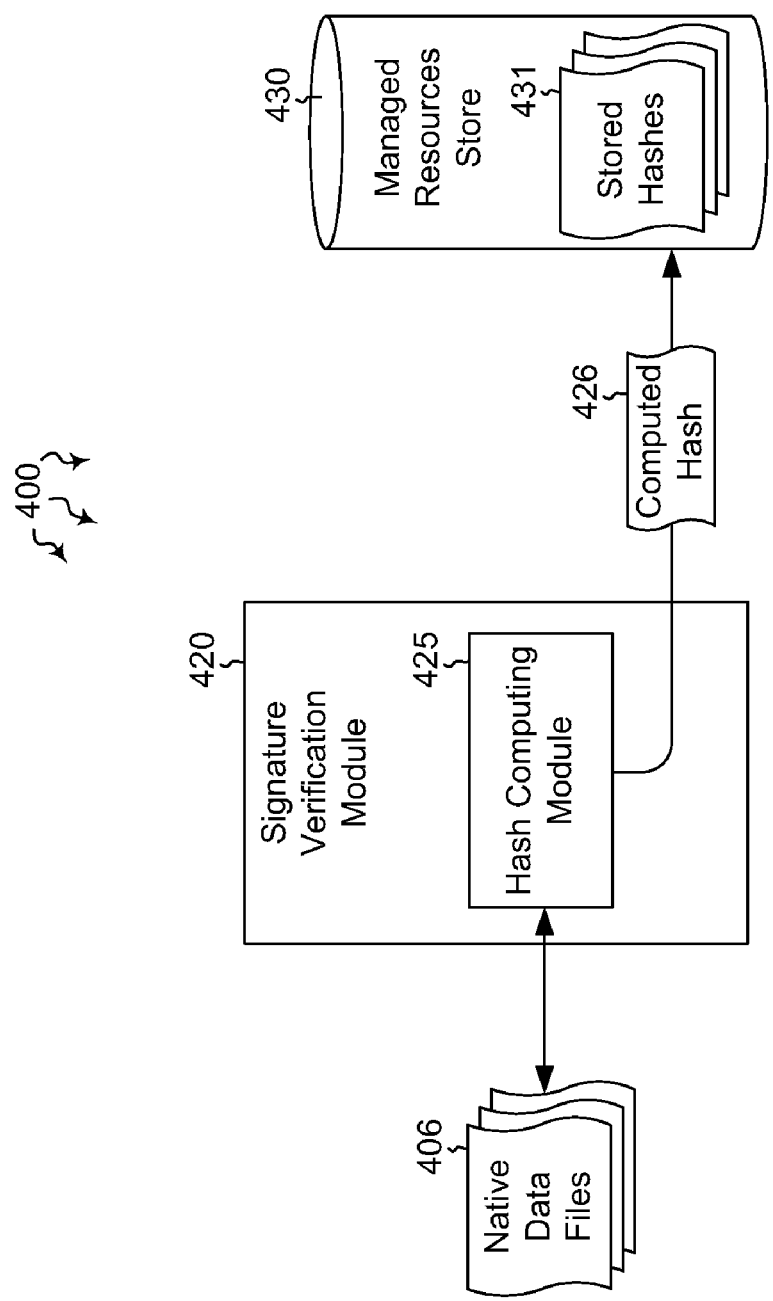
FIG. 4 illustrates an embodiment of the present invention in which signatures are verified.

In some cases (as shown in FIG. 4), a hash algorithm (e.g. secure hash algorithm 256 (SHA256)) may be used to compute the hash of native data files 406 and store the computed hash 426 in a managed resources store 430. When the native data file(s) is/are loaded, hash algorithm previously used is used again to re-compute the hash for the file(s) being loaded, and verifies that the native code being loaded has not been altered. Additionally or alternatively, signature verification may be used to ensure that only signed binaries with a proper certificate are loaded.

Communication with the loaded native data files may be secured by accessing a securely stored handle 116 instead of merely invoking a file based on its name. The securely stored handle 116 of the securely loaded native binary may be accessed and, from that handle, a trusted pointer function 117 may be used to invoke the required function. In this manner, the managed component 110 ensures that the proper native code is being executed.

Still further, managed component 110 may ensure that the native code does not access restricted resources. To ensure that any resource accessed through native code has proper permissions, before calling into the corresponding native code, a security permission request 119 is issued by the managed component for that resource. Thus, for each resource 121 that is accessed for implementation with the native code, permissions are verified to validate the resource's use. These concepts will be explained in greater detail below with regard to methods 200 and 300 of FIGS. 2 and 3.

Figure 2:
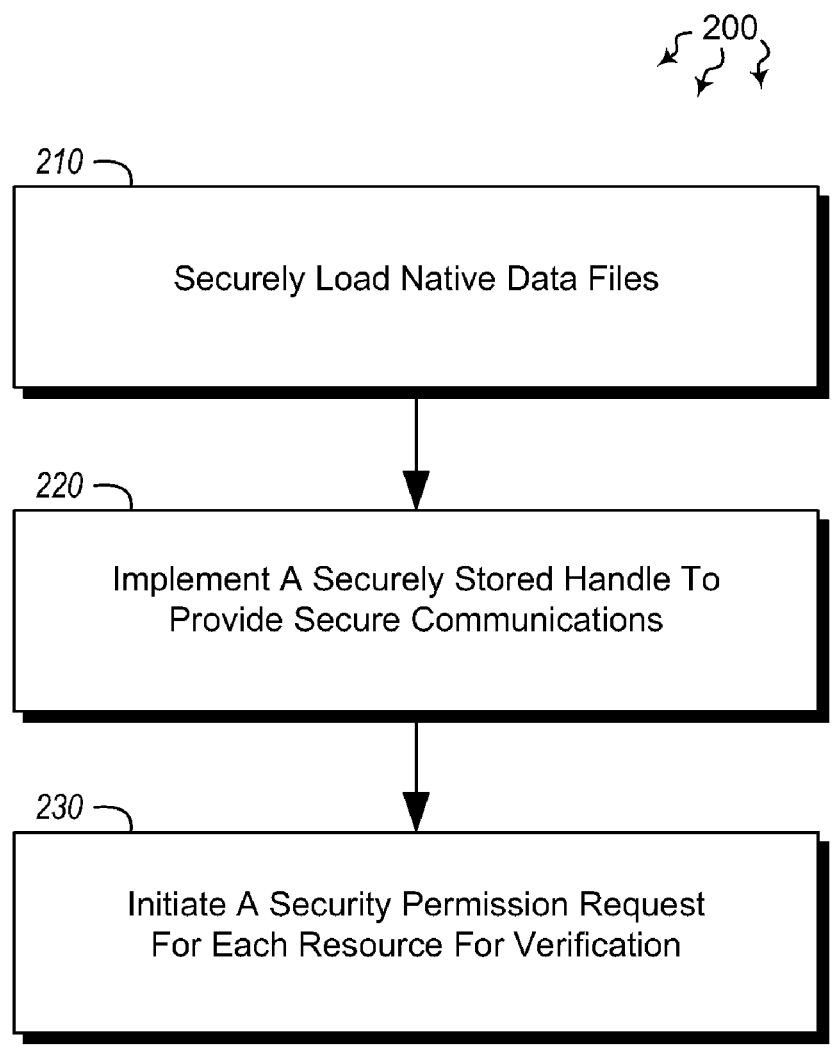
FIG. 2 illustrates a flowchart of an example method for securing mixed-mode applications in a semi-trusted environment.
Figure 3:
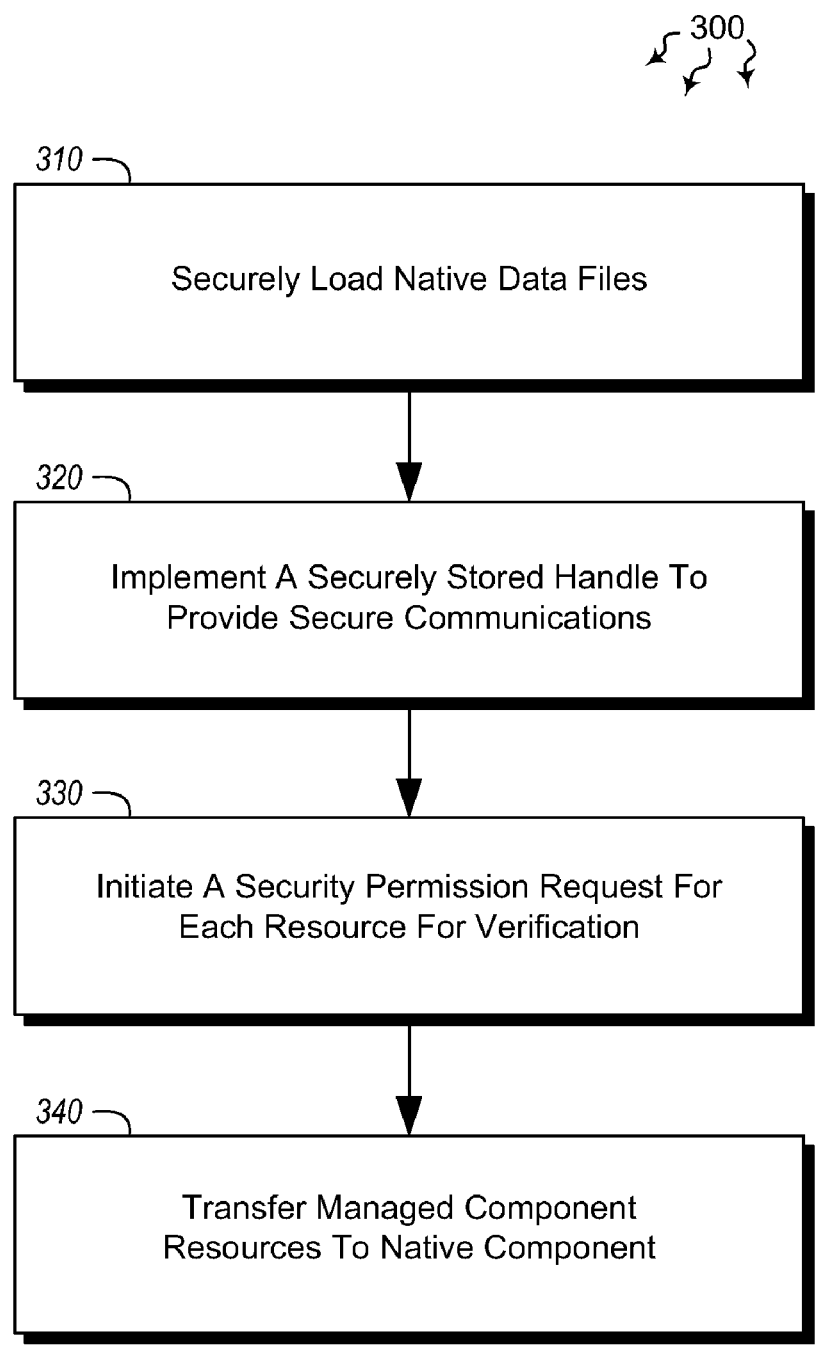
FIG. 3 illustrates a flowchart of an alternative example method for securing mixed-mode applications in a semi-trusted environment.

In view of the systems and architectures described above, methodologies that may be implemented in accordance with the disclosed subject matter will be better appreciated with reference to the flow charts of FIGS. 2 and 3. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for securing mixed-mode applications in a semi-trusted environment. The method 200 will now be described with frequent reference to the components and data of environment 100 of FIG. 1 and environment 400 of FIG. 4.

Method 200 includes an act of a managed component securely loading one or more native data files associated with a mixed-mode application, wherein the secure loading ensures that the native components upon which the managed component depends are authentic (act 210). For example, secure loading module 115 of managed component 110 may securely load native data files 106A associated with mixed-mode application 105. The secure loading ensures that the native code 106 upon which the managed code 107 depends is authentic.

As indicated above, mixed-mode application 105 is a software application or function that combines native software code 106 with managed software code 107. The resources accessed by the code may be stored in unsecure storage areas (e.g. data store 120) which are accessible by a plurality of different users. Secure loading module 115 may securely load native data files 106A while performing signature verification on each data file to ensure that only properly signed native data files with proper certificates are loaded. Thus, a mixed-mode application may provide certificates for each data file so that each data file can be verified as belonging to the application. In some cases, signature verification includes matching a public key to a key provided in the mixed-mode application, to ensure that the files being loaded are part of the application, and have not been altered by another user or application.

Additionally or alternatively, signature verification may include multiple different steps (as shown in FIG. 4). Hash computing module 425 of signature verification module 420 may implement a hash function to compute the hash of the native data files 406. The computed hash 426 may be stored in a managed resources store 430 (along with other stored hashes 431). Upon loading the native data files, hash computing module 425 may re-compute the hash for the loaded files and verify each data file's re-computed hash against the original hash to ensure that the proper native data file is loaded. By comparing the hash files, the signature verification module 420 may verify that the native data files have not been changed or altered in any way. In some embodiments, both hash and signature verification may be used to ensure that the native data files being loaded are valid and unaltered. If either the hash verification or the signature verification fails, the managed component may provide an error indication indicating that the native data files have been altered.

Returning to FIG. 2, method 200 includes an act of the managed component implementing a securely stored handle associated with the loaded native data files to provide secure communications between the managed component and the loaded native data files, wherein the handle provides a trusted function pointer to an associated mixed-mode application function (act 220). For example, managed component 110 may implement securely stored handle 116 which is associated with native data files 106A to provide secure communications between managed component 110 and the native data files. In some cases, mixed-mode application objects associated with the mixed-mode application are stored in a secure, managed environment for retrieval (e.g. data store 120). The managed environment may comprise a database (of any type), a storage hardware device, or any other type of storage system. Each application object may have a set of permissions associated with it, such that it cannot be invoked without the proper permissions. Such permissions enhance the security of the application objects.

Method 200 includes an act of the managed component initiating a security permission request for each resource that is passed to the native components during execution of the mixed-mode application, such that each resource is verified before execution (act 230). For example, managed component 110 may initiate or send security permission request 119 for each resource that is to be passed to the native code components of the mixed-mode application as part of the application's execution. In this manner, each resource 121 that is accessed is accessed securely through the managed component 110. In some embodiments, the managed component may transfer managed component resources 121 (for which security permission was granted) to the loaded native code for implementation as part of the mixed-mode application. Thus, by combining security techniques, the security of the managed to native communication may be improved.

FIG. 3 illustrates a flowchart of a method 300 for securing mixed-mode applications in a semi-trusted environment. The method 300 will now be described with frequent reference to the components and data of environment 100.

Method 300 includes an act of a managed component securely loading one or more native data files associated with a mixed-mode application, wherein the secure loading ensures that the native components upon which the managed component depends are authentic (act 310). For example, secure loading module 115 of managed component 110 may securely load native data files 106A, which are part of mixed-mode application 105. The secure loading module ensures that each native file loaded is authentic and legitimately part of application 105.

As indicated above, securely loading the native data files may include performing signature verification on each data file to ensure that only properly signed native data files with proper certificates are loaded. In some cases, signature verification includes matching a public key to a key provided in the mixed-mode application. Signature verification may also include implementing a hash function to compute the hash of the native data files, storing the computed hash in a managed resources store and, upon loading the native data files, re-computing and verifying each data file's corresponding hash to ensure that the proper native data file is loaded. The hash function may be SHA-based or may include any other type of hash function available on the market. Securely loading the native data files may include performing both hash verification and signature verification to ensure that the loaded file has not been altered and has a proper digital certificate. If either the hash verification or the signature verification failed, the managed component 110 may indicate that the native data files have been altered and should not be loaded.

Method 300 includes an act of the managed component implementing a securely stored handle associated with the loaded native data files to provide secure communications between the managed component and the loaded native data files, wherein the handle provides a trusted function pointer to an associated mixed-mode application function (act 320). For example, managed component 110 may access securely stored handle 116 which is associated with native data files 106A to provide secure communications between managed component 110 and the loaded native data files. The trusted function pointer 117 may be configured to point to an associated mixed-mode application function. The pointer may be used as a more reliable way of referring to a function or file than using the file's name, as the function pointer is trusted and is stored securely.

Method 300 includes an act of the managed component initiating a security permission request for each resource that is passed to the native components during execution of the mixed-mode application, such that each resource is verified before execution (act 330). For example, managed component 110 may also initiate security permission request 119 for each resource 121 requested by the native code during execution of the mixed-mode application. Thus, each resource used by the application is also securely accessed, in that proper permissions are checked and verified to ensure that the application (or user using the application) has proper permissions to access the stored resources.

Method 300 also includes an act of the managed component transferring one or more managed component resources to the loaded native component for implementation in the mixed-mode application (act 340). For example, managed component 110 may transfer resources 121 to the loaded native code for implementation as part of the mixed mode application. Thus, the native files are securely loaded, functions used by the native code are securely invoked, and resources accessed by the native code functions are securely accessed. In this manner, a mixed-mode application is securely run in a semi-trusted environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. At a computer system including a processor and a memory, in a computer networking environment including a plurality of computing systems, a computer-implemented method for securing mixed-mode applications in a semi-trusted environment, the method comprising:
    an act of the processor processing a managed component that securely loads one or more native data files associated with a mixed-mode application, wherein the secure loading ensures that the native components upon which the managed component depends are authentic;
    an act of the processor processing the managed component to implement a securely stored handle associated with the loaded native data files to provide secure communications between the managed component and the loaded native data files, wherein the handle provides a trusted function pointer to an associated mixed-mode application function; and
    an act of the processor processing the managed component to initiate a security permission request for each resource that is passed to the native components during execution of the mixed-mode application, such that each resource is verified before execution.

2. The method of claim 1, wherein the mixed-mode application comprises a software application that combines native software code with managed software code.

3. The method of claim 1, wherein securely loading native data files comprises performing signature verification on each data file to ensure only properly signed native data files with proper certificates are loaded.

4. The method of claim 3, wherein signature verification comprises matching a public key to a key provided in the mixed-mode application.

5. The method of claim 3, wherein signature verification comprises the following:
    an act of implementing a hash function to compute the hash of the native data files;
    an act of storing the computed hash in a managed resources store; and
    upon loading the native data files, re-computing and verifying each data file's corresponding hash to ensure that the proper native data file is loaded.

6. The method of claim 5, wherein the hash function comprises a secure hash algorithm-based (SHA-based) function.

7. The method of claim 5, wherein securely loading the native data files comprises performing both hash and signature verification.

8. The method of claim 7, wherein upon determining that either the hash verification or the signature verification failed, an act of indicating that the native data files have been altered.

9. The method of claim 1, wherein mixed-mode application objects are stored in a secure, managed environment for retrieval.

10. The method of claim 1, further comprising an act of the managed component transferring one or more managed component resources to the loaded native component for implementation in the mixed-mode application.

11. The method of claim 1, wherein the resources are stored in unsecure storage areas.

12. A computer program product for implementing a method for securing mixed-mode applications in a semi-trusted environment, the computer program product comprising a computer-readable storage memory having stored thereon computer-executable instructions that, when executed by one or more processors of the computing system, cause the computing system to perform the method, the method comprising:
   an act of a managed component securely loading one or more native data files associated with a mixed-mode application, wherein the secure loading ensures that the native components upon which the managed component depends are authentic;
   an act of the managed component implementing a securely stored handle associated with the loaded native data files to provide secure communications between the managed component and the loaded native data files, wherein the handle provides a trusted function pointer to an associated mixed-mode application function; and
   an act of the managed component initiating a security permission request for each resource that is passed to the native components during execution of the mixed-mode application, such that each resource is verified before execution.

13. The computer program product of claim 12, wherein securely loading native data files comprises performing signature verification on each data file to ensure only properly signed native data files with proper certificates are loaded.

14. The computer program product of claim 13, wherein signature verification comprises matching a public key to a key provided in the mixed-mode application.

15. The computer program product of claim 13, wherein signature verification comprises the following:
   an act of implementing a hash function to compute the hash of the native data files;
   an act of storing the computed hash in a managed resources store; and
   upon loading the native data files, re-computing and verifying each data file's corresponding hash to ensure that the proper native data file is loaded.

16. The computer program product of claim 13, wherein securely loading the native data files comprises performing both hash and signature verification.

17. The computer program product of claim 16, wherein upon determining that either the hash verification or the signature verification failed, an act of indicating that the native data files have been altered.

18. The computer program product of claim 12, further comprising an act of transferring one or more managed components to the loaded native component to open the managed components.

19. A computer system comprising the following:
   one or more processors;
   system memory;
   one or more computer-readable storage media having stored thereon computer-executable instructions that, when executed by the one or more processors, causes the computing system to perform a method for securing mixed-mode applications in a semi-trusted environment, the method comprising the following:
      an act of a managed component securely loading one or more native data files associated with a mixed-mode application, wherein the secure loading ensures that the native components upon which the managed component depends are authentic, and wherein the secure loading includes performing signature verification on each data file to ensure only properly signed native data files with proper certificates are loaded;
      an act of the managed component implementing a securely stored handle associated with the loaded native data files to provide secure communications between the managed component and the loaded native data files, wherein the handle provides a trusted function pointer to an associated mixed-mode application function;
      an act of the managed component initiating a security permission request for each resource that is passed to the native components during execution of the mixed-mode application, such that each resource is verified before execution, and wherein mixed-mode application resources are stored in a secure, managed environment for retrieval; and
      an act of the managed component transferring one or more managed component resources to the loaded native component for implementation in the mixed-mode application.

20. The system of claim 19, wherein signature verification comprises the following:
   an act of implementing a hash function to compute the hash of the native data files;
   an act of storing the computed hash in a managed resources store; and
   upon loading the native data files, re-computing and verifying each data file's corresponding hash to ensure that the proper native data file is loaded.

* * * * *